United States Patent [19]
Takahashi

[11] Patent Number: 5,622,434
[45] Date of Patent: Apr. 22, 1997

[54] LINEAR BEARING STRUCTURE

[76] Inventor: Shigeo Takahashi, 1-21-16 Soshigaya, Setagaya-ku 157, Tokyo, Japan

[21] Appl. No.: 636,794

[22] Filed: Apr. 22, 1996

[30] Foreign Application Priority Data

Jun. 28, 1995 [JP] Japan ................................ 7-184726

[51] Int. Cl.⁶ .................................................. F16C 29/04
[52] U.S. Cl. ................................. 384/49; 384/16
[58] Field of Search ............................. 384/49, 15, 16, 384/10, 55, 59

[56] References Cited

U.S. PATENT DOCUMENTS

| | | | |
|---|---|---|---|
| 3,043,634 | 7/1962 | Coley | 384/49 |
| 3,674,324 | 7/1972 | Schweizer et al. | 384/49 |
| 4,544,212 | 10/1985 | Parzefall et al. | 384/49 |

FOREIGN PATENT DOCUMENTS

| | | | |
|---|---|---|---|
| 1457367 | 11/1966 | France | 384/49 |
| 116886 | 7/1946 | Sweden | 384/49 |

*Primary Examiner*—Thomas R. Hannon
*Attorney, Agent, or Firm*—McGlew and Tuttle

[57] ABSTRACT

A linear bearing structure comprises a bearing bush, a plurality of annular ball retainers each holding a plurality of bearing balls, circumferentially and a pair of annular endpieces respectively removably secured to ends of the bush to confine the ball retainers therein. The bearing bush comprises an outer metal cylinder and an inner cylindrical lining layer formed by a bearing material having a small coefficient of friction and a small coefficient of wear and is provided with a slit which has a predetermined width and extends along the axis of the bush over the entire length thereof so that the bush can be circumferentially elastically compressed by a magnitude corresponding to the width of the slit. Each of the endpieces has, at the inner side thereof, an annular groove having a diameter smaller than that of the bush so that by compressing the bush into the annular grooves of the endpieces at the ends of the bush, the bush and the endpieces can be elastically fitted together.

7 Claims, 3 Drawing Sheets

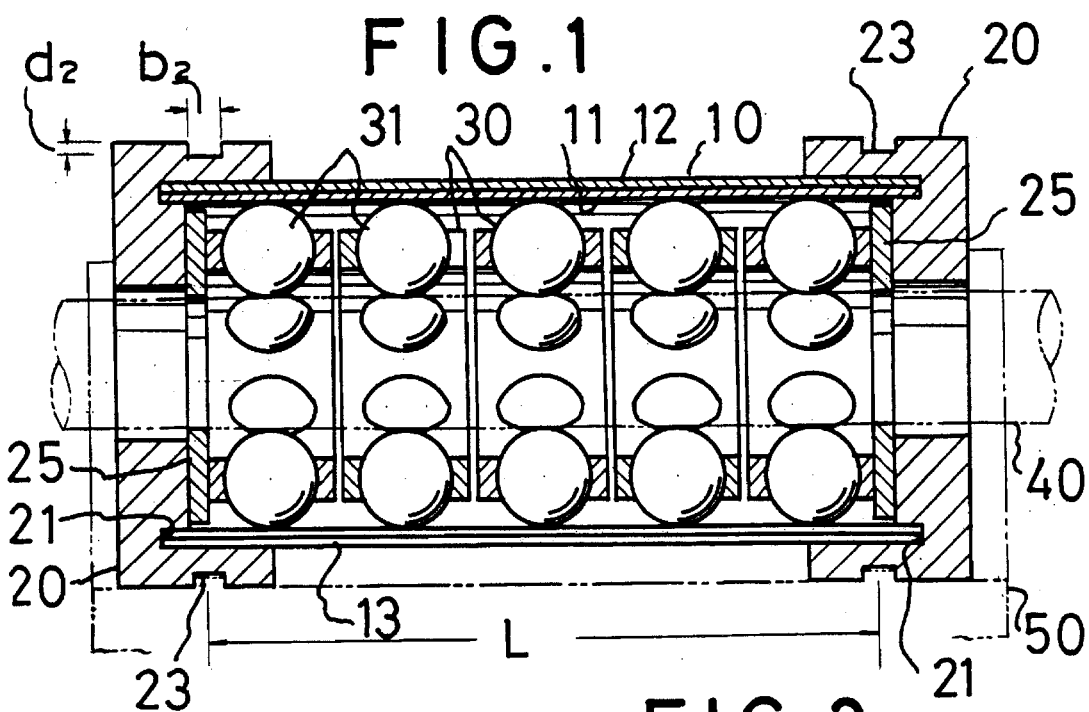
FIG.1
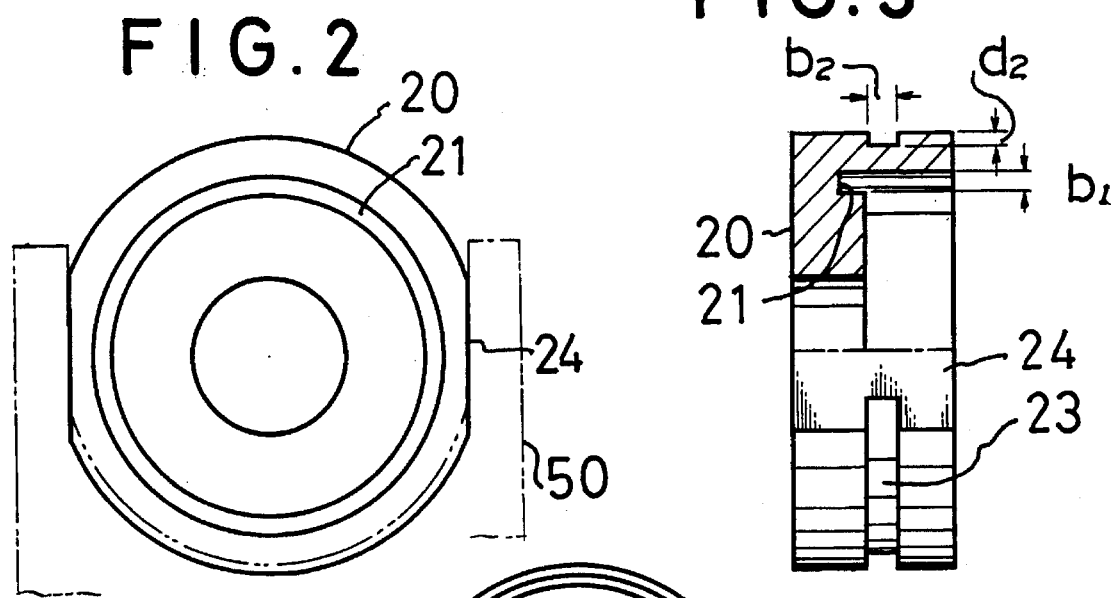
FIG.2
FIG.3
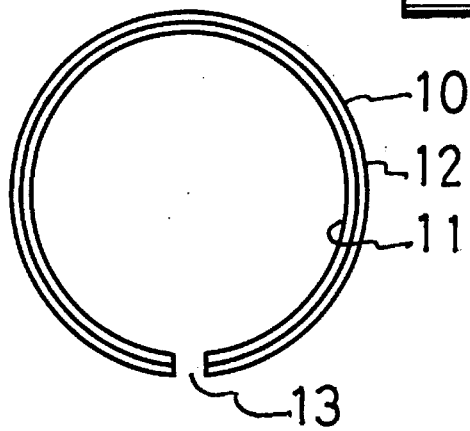
FIG.4

LINEAR BEARING STRUCTURE

FIELD OF THE INVENTION

The present invention relates generally to bearings, and more particularly to linear bearings which are used mainly for supporting reciprocating members, such as carriages employed in office machines, such as copying machines, printers for computers and the like.

BACKGROUD OF THE INVENTION

A linear bearing of the kind described above is known which comprises, as shown in FIGS. 9 and 10, a cylindrical housing 1 having an axially extending corrugated inner surface and a particular annular ball retainer 3 provided inside the housing 1 and having therein a plurality of guide grooves 2 for retaining bearing balls 4 which are brought into rolling contact with a peripheral surface of a slide shaft to be axially passed through the retainer 3 and a plurality of axially extending guide grooves 2' which are formed in an outer periphery of the retainer 3 to circulate the balls 4 between the housing 1 and the retainer 3. Accordingly, the prior art linear bearing has a complicated structure which makes it hard to make, thus making it difficult for the bearing to be produced and sold at a reasonable cost. Moreover, with such a structure of the known linear bearing, it is impossible to fabricate a different length of linear bearing by replacing its parts with other interchangeable parts.

SUMMARY OF THE INVENTION

The present invention is intended to eliminate the disadvantages or drawbacks indicated with the prior art as described above and to provide an improved linear bearing.

To these ends, in accordance with the present invention, there is provided a linear bearing structure comprising a bearing bush having ends and a slit having a predetermined width and extending along the axis of said bush over the entire length thereof so that said bush can be circumferentially elastically compressed by a magnitude corresponding to the width of said slit, said bush including an outer metal cylinder and an inner cylindrical lining layer formed by a material having a small coefficient of friction and a small coefficient of wear; a plurality of annular ball retainers circumferentially holding a plurality of bearing balls spaced from each other and contacting the inner peripheral surface of said cylindrical lining layer; and a pair of annular endpieces respectively removably secured to the ends of said bush to confine said annular ball retainers therein, each of said endpieces having at the inner side thereof an annular groove of a predetermined width and depth, being coaxial with said bush and having a diameter smaller than that of said bush so that by compressing said bush into the annular grooves of said endpieces at the ends of said bush, said bush and said endpieces can be elastically fitted together.

It is, therefore, one object of the present invention to provide an improved linear bearing which is simple in structure, light in weight and suitable for use in office machines, such as copying machines, printers for computers and the like.

It is another object of the present invention to provide a linear bearing of the kind described above which has high bearing strength and high durability.

It is a further object of the invention to provide a linear bearing of the kind described above which can be fabricated easily and sold at a reasonable cost.

It is a still further object of the invention to provide a linear bearing of the kind described above which can be fabricated so as to have a desired axial length by using interchangeable parts of predetermined shape and size.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF DRAWINGS

FIG. 1 is a vertical cross-sectional side view, in an enlarged scale, of one embodiment of the present invention;

FIG. 2 is a front view of an endpiece of the linear bearing shown in FIG. 1;

FIG. 3 is a partly cross-sectional view of the endpiece of the bearing of FIG. 2;

FIG. 4 is a front view of a bearing bush of the bearing shown in FIG. 1;

DETAILED DESCRIPTION OF THE PREFERRED EMBODIMENTS

Figure 5:
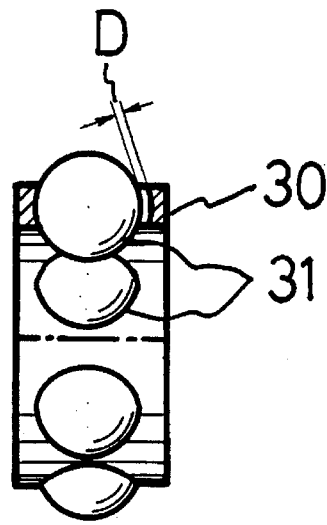
FIG. 5 is a partly cross-sectional side view of a ball retainer of the bearing shown in FIG. 1.
Figure 6:
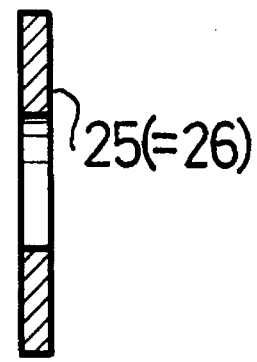
FIG. 6 is a vertical cross-sectional side view of a dust-preventing ring of the bearing shown in FIG. 1.

Referring to the drawings in FIGS. 1 to 6, there is shown a linear bearing as one embodiment of the present invention which comprises a bearing bush 10, a pair of annular endpieces 20 and a plurality of annular ball retainers 30 each circumferentially holding a plurality of bearing balls 31.

The bearing bush 10 includes an outer metal cylinder 12 which is made from plain carbon steel, stainless steel, phosphorus bronze or the like and an inner cylindrical lining layer 11 which is formed of an oilless material, such as molytetrafluoroethylene (hereinafter called "PTFE"), silicon resin, a sinter of bronze powder containing a mixture of PTFE and lead, a material formed by uniformly dispersing fine particles of black lead into base bronze, a material formed by uniformly dispersing fine particles of black lead and molybdenum bisulfide, or a morous metal, such as a porous bronze, a porous brass or a porous white metal, impregnated with lubricating oil. These materials have a small coefficient of friction and a small coefficient of friction.

The inner layer 11 may be formed of a sheet of woven or nonwoven fabric impregnated with PETE and silicon resin. As a material for such a fabric, synthetic resin fibers, rock wool fibers, glass fibers or carbon fibers can be used. Also, the inner layer 11 may be formed of a material comprising those resins and powder of black lead or molybdenum bisulfide mixed therewith. Furthermore, the inner layer 11 may be formed of a thin punch plate of gun metal or of white metal. It may also be formed of a material comprising a thin plate made from gun metal or white metal and having a finely toughened surface formed by etching and a layer formed of powder of lead, of black lead or of molybdenum bissulfide and securely fixed to the inner surface of the thin plate. Such plates may be securely attached to the inner surface of the outer metal cylinder by means of silver solder. Thus, it will be seen that an oilless material for the inner layer 11 can be selected from among a variety of the foregoing materials. Preferably, the thickness of the inner layer 11 is 0.5 to 2 mm.

The thickness of said outer metal cylinder 12 is determined depending upon its size and/or diameter or a magnitude of the load to be applied thereto. In case where a linear bearing of the present invention is used for supporting reciprocating members, such as carriages employed in office machines, such as printers for computers and the like, the thickness of the metal cylinder 12 is usually 1 to 3 mm. Howeverm in case where the linear bearing is used for the reciprocating members employed in conveyers or the like for carrying relatively heavy weights, the thickness of the metal cylinder 12 should be more than 10 mm. The entire length of the bearing bush 10 is determined in relation to the axial length of an individual ball retainer 30 and the number of the ball retainers 30 to be used. In the illustrated embodiment, the bearing bush 10 contains five annular ball retainers 30 each circumferentially holding a plurality of bearing balls 31 spaced from each other and contacting the inner surface of the bush 10.

As clearly shown in FIGS. 1 and 4, the bearing bush 10 is provided with a silt 13 which has a predetermined width and extends along the axis of said bush over the entire length thereof so that said bush can be circumferentially elastically compressed by a magnitude corresponding to the width of said slit 13. It is preferable that the width of the slit 13 is 2 to 3% of the circumference of the bush 10. For example, in the bush 10 having the inside diameter of 20 mm, the width of the slit 13 is 1 to 1.5 mm.

Each of the pair of annular endpieces 20 has, as shown in FIGS. 1 to 3, the same configurations and size as those of the other. Each of said endpieces can be formed of engineering plastics, such as polyimide resin, phenolic plastic, polycarbonate, etc. or of such plastics reinforced with glass fibers, metal powder, etc. These materials are shown only as exemplary materials for the endpieces and are not limited thereto. Other materials can be used for manufacturing endpieces 20, provided that they have sufficient mechanical strength and thermal stability. In case where the linear bearing is designed for use in conveyers or other industrial machines, the endpieces should be of a stamp work, diecasting, sinter or the like.

Each endpiece 20 is generally doughnut-shaped. It has the outer diameter larger than that of the bearing bush 10 and has an inner diameter slightly larger than the outer diameter of a slide shaft 40 to be used. Each endpiece 20 is provided, in an end face thereof, with a first annular groove 21 of a predetermined width b1 and depth d1. This annular groove 21 is formed concentrically with the bearing bush 10 and has a diameter smaller than the outer diameter thereof so that by compressing the bush into the annual grooves 21 of the endpieces 21 at the ends of said bush, said bush and said endpieces can be elastically fitted together. It is desirable that the width b1 of the groove 21 corresponds substantially to the thickness of the bearing bush 10 and that the depth d1 of the groove 21 is twice or three times as much as the thickness of the bush 10 so that as the bush 10 is circumferentially compressed against the spring action thereof by a magnitude corresponding exactly or nearly to the width of slit 13 of the bush 10 and fitted into the annular grooves 21 of the endpieces 20, said bush and said endpieces can be snugly and securely assembled.

Each endpiece 20 is also provided, in its outer periphery, with a second annular groove 23 which serves as a mounting means for mounting the linear bearing on a carriage 50 to be employed in a machine. Instead of or in addition to the second annular groove 23, one or a plurality of flat mounting surfaces 24 can be provided at the outer periphery of endpiece 20, as shown in FIG. 2. The flat surface or surfaces 24 make it possible to securely fix the bearing to the carriage 50.

Indicated by reference numeral 25 is a ring for preventing dusts from penetrating into the linear bearing. This ring 25 is usually made of a felting. The inside diameter of the ring 25 is designed so that the inner periphery thereof is brought into pressure contact with the peripheral surface of the shaft 40.

Denoted by reference numeral 30 are a plurality of annular ball retainers which are axially arranged inside the bearing bush 10. Each of the ball retainers 30 is formed of PETE, silicon resin or other engineering plastics and is formed, in its peripheral portion, with a plurarity of circular openings 32 which are spaced from each other so as to retain bearing balls 31 therein, individually. As shown in FIG. 5, each opening 32 is provided with a clearance D which is formed between the spherical surface of a bearing ball 31 and the inner peripheral surface of the opening 32, so that each ball 31 is movable within each opening 32 along the longitudinal axis of the shaft 40. Preferably, each ball retainer 30 is provided with 5 to 8 openings 32 for movably receiving the balls 31. The dimension of the clearance D is to the order of 50 micron to 2 mm. The bearing balls 31 for use in the linear bearing are, in general, steel balls, but ceramics balls can be used as bearing balls for the bearing.

In assembling operation, first, a plurality of annular ball retainners 30 are inserted into the bearing bush 10, together with the bearing balls 31 retained by each of the ball retainers 30. In the illustrated embodiment, five ball retainers 30 each holding six bearing balls 31 are inserted into the bush 10 which is so sized as to contain five ball retainers 30 each having the same size. In this connection, it is to be noted that the number of the ball retainers 30 to be used vary depending upon variation of the longitudinal length of the bush 10 to be used. Then, a pair of dust-preventing rings 25 is inserted in the bearing bush 10 in such a way that one of the pair is inserted therein from one end thereof and the other of the pair is inserted in the bush from the other end thereof to thereby confine the ball retainers 30 with bearing balls 31 between the pair of dust-preventing rings 25 and finally, the bearing bush 10 and a pair of endpieces 20 are elastically fitted together in such a manner that the bush 10 is circumferentially compressed so as to reduce its diameter by a magnitude corresponding substantially to, i.e., exactly or nearly to the width of slit 13 of the bush and then both ends of the bush 10 are fitted into the first annular grooves 21 of endpieces 20 are snugly and firmly fitted together by the resilience of the bush. Thus, the linear bearing of the present invention can be assembled without using fasteners and the like.

When the linear bearing is used in a machine, it is mounted on the shaft 40 having circular cross-section shape and is fixed to the carriage 50 by utilizing the second annular grooves 23 of the endpieces 20. In so doing, each bearing ball 31 is brought into contact with both the inner surface of bush 10 and the peripheral surface of shaft 40. As the carriage 50 is displaced axially along the shaft 40, the linear bearing is axially displaced therewith and each bearing ball 31 held by each ball retainer 30 is also moved while being contacted with both the inner surface of inner cylindrical layer 11 of the bearing bush 10. In this connection, it should be noted that the annular ball retainers 30 are movably arranged between the endpieces 20 such that each of them can move both in the axial direction and in the circumferential direction. More specifically, each ball retainer 30 with bearing balls 31 not only can axially move along the shaft 40 within the range of an annular space between the pair of endpieces 20, but also can circumferentially move within the range of the aforementioned clearance D formed in each ball retainer 30. Accordingly, as the carriage 50 is moved, the linear bearing is smoothly moved therewith in a direction in which the carriage is moved within a predetermined range.

Figure 7:
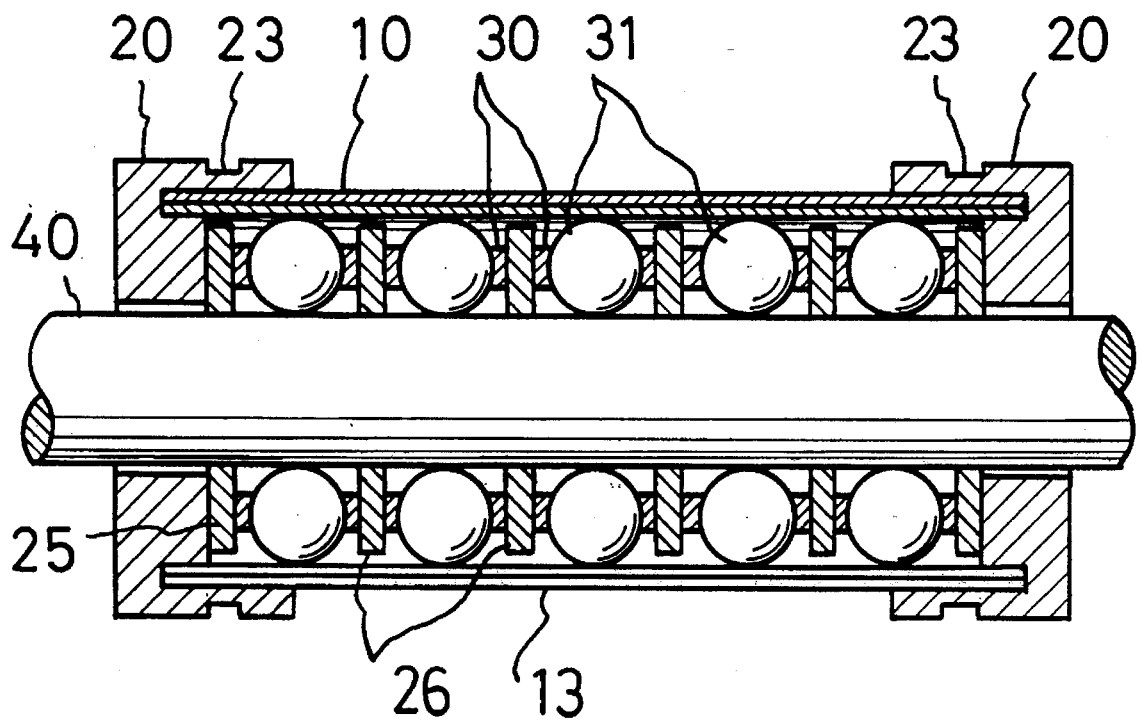
FIG. 7 is a vertical cross-sectional side view, in an enlarged scale, of another embodiment of the present invention, showing the state in which it is mounted on a slide shaft.

Referring now to FIG. 7, there is shown a linear bearing as a second embodiment of the present invention. In this embodiment, there are provided four oil rings 26 which are respectively interposed between the five annular ball retainers 30 axially arranged within the bearing bush 10. Each of the oil rings 26 is of the same shape and material as the dust-preventing ring 25 and is impregnated with lubricating oil, such as greese. Also, a sufficient amount of such a lubricant is applied onto the outer periphery of each of the ball retainers 30 with bearing balls 31. The inner cylindrical lining layer of the bearing bush 10 is made from white metal, bronze or gun metal having a small coefficient of friction and a small coefficient of wear.

The second embodiment is fabricated and used in the same manner as the first embodiment. As the machine in which the linear bearing is used is operated, the lubricating oil impregnated in each oil ring 26 is automatically supplied to the peripheral surface of the shaft 40 and at the same time the inner surface of said lining layer is also lubricated by rolling motion of the bearing ball 31 with the lubricating oil, whereby frictional wear of these ball-contacting portions are reduced. In this case, superfluous lubricating oil adheared to the shaft 40 is wiped off by the pair of dust-preventing rings 25 which prevent fine dusts from invading into the bush 10 from the outside. As the case may be, it will be desirable to cover the slit 13 with an oil-resistant adhesive tape, not shown, to prevent leakage of the oil as used in the linear bearing.

Figure 8:
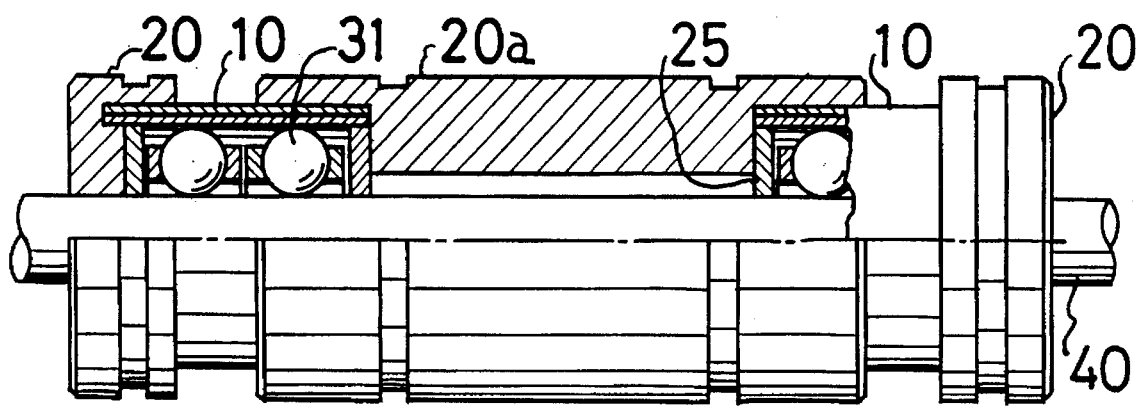
FIG. 8 is a vertical partly cross-sectional side view, in an enlarged scale, of a further embodiment of the present invention, showing the state in which it is mounted on a slide shaft.
Figure 9:
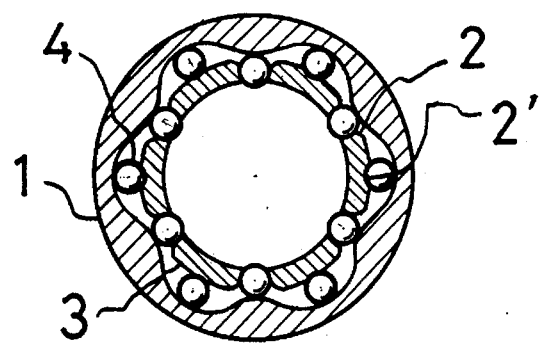
FIG. 9 is a vertical cross-sectional front view, in an enlarged scale, of a prior art linear bearing.
Figure 10:
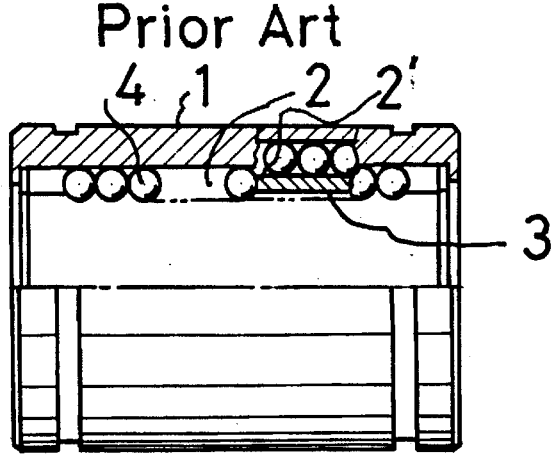
FIG. 10 is a partly cross-sectional side view of the prior art bearing shown in FIG. 9.

Referring now to FIG. 8, a linear bearing as a third embodiment of the present invention is illustrated therein. Parts or portions of the bearing that correspond to those of the foregoing embodiments are designated with like numerals and letters. As shown, this bearing includes a cylindrical housing 20a and a pair of bearing bushes 10 fixed thereto at its ends, respectively. The housing 20a has in its outer periphery a pair of annular grooves similar to the annular grooves of the endpieces 20 and available for means to attach the bearing to the carriage previously mentioned. This bearing operates in the same way as the foregoing embodiments.

In the foregoing embodiments, if the shaft 40 is rotatably supported on supports and arranged to be rotated by a gear drive, a belt drive or the like or to be manually rotated, and, as it is rotated, contacting points between each bearing ball 31 and bearing bush 10 are gradually displaced circumferentially of the shaft 40 during rotational motion thereof. Such a displacement of the contacting points makes it possible to prolong a life of the bearing bush 10, since frictional wear thereof can be reduced by said displacement.

With the construction of the linear bearing of the present invention, the bearing not only can be easily fabricated with a relatively small number of parts, but can be simplified in structure and made smaller in dimensions than conventional linear bearings. Further, since the bearing bush 10 is elastically deformable and can therefore be securely fitted with each of the endpieces 20 by the spring action of the bush 10 and, in addition, the linear bearing is, normally, fixed to a carriage in a machine at the endpieces 20 which are securely attached to the ends of bush 10, there can be no such a trouble that the bush and the endpieces are caused to be separated from each other during operation of the machine. Furthermore, the provision of a slit 13 in the bush 10 will not become a bar or obstacle for practical use of the linear bearing, as long as the bearing is used in such a way that the slit 13 is positioned on the side opposite to the side portion to which the bearing load is imparted.

It is to be noted that the provision of the movable ball retainers 30 in the manner as mentioned above helps prolong a life of bush 10, since the balls 31 held by the retainers 30 do not continuously contact with the same portions of the bush 10 and frictional wear thereof can be reduced.

Also, when it is desired to replace the bearing bush 10 with a new bearing bush, it is easy to do so, since the linear bearing of the present invention is of the structure which can be easily dismounted only by pulling the endpieces 20 out of the bush 10. Similarly, linear bearings each having a different length can be easily fabricated by combining bushes 10 each having a different length with an appropriate number of the annular ball retainers 30, as long as the bushes have the same diameter.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and all range of the claims are intended to be embraced therein.

What is claimed is:

1. A linear bearing structure comprising:

a bearing bush having ends and a slit having a predetermined width and extending along the axis of said bush over the entire length thereof so that said bush can be circumferentially elastically compressed by a magnitude corresponding to the width of said slit, said bush including an outer metal cylinder and an inner cylindrical lining layer formed by a material having a small coefficient of friction and a small coefficient of wear;

a plurality of annular ball retainers axially arranged inside said bush, each of said annular ball retainers circumferentially holding a plurality of bearing balls spaced from each other and contacting the inner peripheral surface of said cylindrical lining layer; and a pair of annular endpieces respectively removably secured to the ends of said bush to confine said annular ball retainers therein, each of said endpieces having at the inner side thereof an annular groove of a predetermined width and depth, being coaxial with said bush and having a diameter smaller than that of said bush so that by compressing said bush into the annular grooves of said endpieces at the ends of said bush, said bush and said endpieces can be elastically fitted together.

2. A linear bearing structure as claimed in claim 1, wherein each of the endpieces is a product made of a metal plate by press working, a product produced by die-casting, a product of sintered metal or a product formed of engineering plastics and wherein each of the endpieces is provided, at an outer peripheral surface thereof, with at least a mounting means for mounting said bearing to a carriage employed in a machine, said mounting means comprising either one of an annular groove and a flat surface portion formed at an outer periphery of said each endpiece.

3. A linear bearing structure as claimed in claim 1, wherein the material having a small coefficient of friction and a small coefficient of wear is polytetrafluoroethylene, silicon resin, sintered bronze impregnated with a mixture of polytetrafluoroethylene and lead, a material formed by uniformly dispersing fine particles of black lead into base bronze, a material formed by uniformly dispersing fine particles of black lead and molybdenum bisulfide, polytetrafluoroethylene mixed with black lead powder, a lubricant-impregnated porous bronze, a lubricant-impregnated porous brass or lubricant-impregnated porous white metal.

4. A linear bearing structure as claimed in claim 1, wherein the material having a small coefficient of friction and a small coefficient of wear is selected from among the group consisting of white metal, bronze and gun metal.

5. A linear bearing structure as claimed in claim 1, wherein said annular ball retainers holding said bearing balls are freely axially movable between said pair of endpieces, respectively.

6. A linear bearing structure as claimed in claim 5, wherein at least one oil ring is provided at a portion between said pair of endpieces, said oil ring being formed of a porous, flexible material and having an inner peripheral surface contacting a peripheral surface of the slide shaft on which the bearing is to be slidably mounted.

7. A linear bearing structure as claimed in claim 1, wherein a pair of dust-preventing rings is provided within said bearing bush at portions adjacent to the longitudinal ends thereof where said endpieces are respectively positioned, each of said dust-preventing rings being formed of a porous, flexible material and having an inner peripheral surface contacting a peripheral surface of the slide shaft on which the bearing is to be slidably mounted.

* * * * *